((12)) United States Patent
Shimazu (10) Patent No.: US 10,422,558 B2
(45) Date of Patent: Sep. 24, 2019

(54) REFRIGERATION CYCLE DEVICE

(71) Applicants: Mitsubishi Electric Corporation, Tokyo (JP); AGC INC., Tokyo (JP)

(72) Inventor: Yusuke Shimazu, Tokyo (JP)

(73) Assignees: Mitsubishi Electric Corporation, Tokyo (JP); AGC INC., Tokyo (JP)

( * ) Notice: Subject to any disclaimer, the term of this patent is extended or adjusted under 35 U.S.C. 154(b) by 69 days.

(21) Appl. No.: 15/124,375

(22) PCT Filed: Mar. 17, 2014

(86) PCT No.: PCT/JP2014/047028
§ 371 (c)(1),
(2) Date: Sep. 8, 2016

(87) PCT Pub. No.: WO2015/140870
PCT Pub. Date: Sep. 24, 2015

(65) Prior Publication Data
US 2017/0016654 A1    Jan. 19, 2017

(51) Int. Cl.
*F25B 31/00* (2006.01)
*F25B 43/02* (2006.01)
(Continued)

(52) U.S. Cl.
CPC .......... *F25B 31/004* (2013.01); *F25B 41/062* (2013.01); *F25B 43/02* (2013.01);
(Continued)

(58) Field of Classification Search
CPC .......... F25B 31/04; F25B 43/00; F25B 43/02; F25B 2400/13; F25B 2341/0662; F25B 2700/191; F25B 41/062; F25B 2600/2513
See application file for complete search history.

(56) References Cited

U.S. PATENT DOCUMENTS 7,350,366 B2 *    4/2008    Yakumaru ............... F25B 9/008
62/116
8,443,624 B2 *    5/2013    Yamashita ............ C09K 5/045
62/498
(Continued)

FOREIGN PATENT DOCUMENTS

CN    102066852 A    5/2011
CN    103562338 A    2/2014
(Continued)

OTHER PUBLICATIONS

International Search Report of the International Searching Authority dated Jun. 17, 2014 for the corresponding international application No. PCT/JP2014/057028 (and English translation).
(Continued)

*Primary Examiner* — Christopher R Zerphey
(74) *Attorney, Agent, or Firm* — Posz Law Group, PLC (57) ABSTRACT

A refrigeration cycle apparatus in which working refrigerant is a zeotropic refrigerant mixture containing at least a first refrigerant and a second refrigerant having a higher boiling point than the first refrigerant at the same pressure, the refrigeration cycle apparatus including at least a main passage in which a compressor, a first heat exchanger, a first expansion valve, and a second heat exchanger are sequentially connected, the first refrigerant having a property of disproportionation, the first refrigerant having a smaller composition ratio in the compressor than a composition ratio of the first refrigerant passing through the main passage.

7 Claims, 2 Drawing Sheets

← — REFRIGERANT FLOW IN STORAGE MODE
← --- REFRIGERANT FLOW IN RELEASE MODE (51) Int. Cl.
*F25B 41/06* (2006.01)
*F25B 43/00* (2006.01)

(52) U.S. Cl.
CPC ....... *F25B 43/00* (2013.01); *F25B 2313/0233* (2013.01); *F25B 2341/0662* (2013.01); *F25B 2400/13* (2013.01); *F25B 2600/2513* (2013.01); *F25B 2700/191* (2013.01)

(56) References Cited

U.S. PATENT DOCUMENTS

| | | | |
|---|---|---|---|
| 2010/0050674 A1* | 3/2010 | Kasahara | F25B 9/008 62/222 |
| 2011/0079042 A1 | 4/2011 | Yamashita et al. | |
| 2011/0126575 A1 | 6/2011 | Kobayashi et al. | |
| 2014/0070132 A1 | 3/2014 | Fukushima | |

FOREIGN PATENT DOCUMENTS

| | | | | |
|---|---|---|---|---|
| EP | 0978693 | A2 | 2/2000 | |
| JP | 63-60847 | U | 4/1988 | |
| JP | H03-13075 | U | 2/1991 | |
| JP | 06-201204 | A | 7/1994 | |
| JP | 2010-236795 | | * 10/2010 | ............ F25B 31/004 |
| JP | 2011-112351 | A | 6/2011 | |
| JP | 2011-196684 | A | 10/2011 | |
| WO | 2009/154149 | A1 | 12/2009 | |
| WO | 2010/113461 | A1 | 10/2010 | |
| WO | 2012/157764 | A1 | 11/2012 | |

OTHER PUBLICATIONS

Office Action dated Jul. 4, 2017 issued in corresponding JP patent application No. 2016-508330 (and English translation).
Extended EP Search Report dated Oct. 19, 2017 corresponding to EP patent application No. 14885882.2.
Office action dated Mar. 15, 2018 issued in corresponding CN patent application No. 2014-800-77009.0 (and English machine translation thereof).
Office Action dated Oct. 15, 2018 issued in corresponding CN patent application No. 201480077009.0 (and English translation).

* cited by examiner

◀—— REFRIGERANT FLOW IN STORAGE MODE
◀--- REFRIGERANT FLOW IN RELEASE MODE

REFRIGERATION CYCLE DEVICE

CROSS REFERENCE TO RELATED APPLICATION

This application is a U.S. national stage application of PCT/JP2014/057028 filed on Mar. 17, 2014, the contents of which are incorporated herein by reference.

TECHNICAL FIELD

The present invention relates to a refrigeration cycle apparatus in which a zeotropic refrigerant mixture is used as working refrigerant.

BACKGROUND ART

Low-GWP refrigerants have been recently developed to suppress the influence of global warming. Conventionally used R410A is a refrigerant with good performance but has a GWP (global warming potential) of about 2000. Thus, R410A has been replaced with R32 having a GWP one third that of R410. R32 is a good-performance refrigerant with physical properties relatively similar to those of R410A and has a GWP of about 600. To achieve lower GWPs, fluoropropene (HFO) refrigerants such as R1234yf have been developed. However, such a refrigerant has a high boiling point with low performance and thus keeping the same performance as that of the related art may cause many technical problems resulting in high cost.

Accordingly, a refrigeration cycle apparatus has been proposed in which a low-GWP refrigerant (e.g., HFO1123) having a low boiling point is used (See Patent Literature 1).

It is known that HFO1123 (low boiling temperature refrigerant) having good performance (capability) less affects the ozone layer since chlorine atoms are not included in the composition and less affects global warming since it has a double bond and short atmospheric lifetime. Moreover, the combustion is classified as rank 2L (low flammability) by ASHRAE, achieving safety.

Furthermore, even mixed refrigerant of HFO1123 and refrigerants such as HO, HFC, HCFO, CFO, and HFO can partially achieve the advantage.

CITATION LIST

Patent Literature

[Patent Literature 1] WO2012/157764

SUMMARY OF INVENTION

Technical Problem

It is known that HFO1123 ($CF_2=CHF$) is a refrigerant of good performance but may cause disproportionation (autolytic reaction) under specific conditions. Disproportionation is a chemical reaction of at least two molecules of the same kind to form at least two different kinds of products. The disproportionation is expressed as the following chemical reaction:

$$CF_2=CHF \rightarrow (1/2)CF_4+(3/2)C+HF+\text{(heat of reaction)}$$

This reaction is caused by applying local energy to refrigerant. Thus, serial reactions may disadvantageously occur at high temperatures and high pressures.

The present invention has been made to overcome the problem. An object of the present invention is to provide a refrigeration cycle apparatus being safe and with good performance that can prevent refrigerant from being placed under the condition of serial reactions even when the refrigerant used for the refrigeration cycle apparatus is such a refrigerant that may cause the disproportionation.

Solution to Problem

A refrigeration cycle apparatus of an embodiment of the present invention is a refrigeration cycle apparatus operating with working refrigerant being a zeotropic refrigerant mixture containing at least first refrigerant and second refrigerant having a higher boiling point than the first refrigerant at a same pressure, the refrigeration cycle apparatus comprising at least a main passage in which a compressor, a first heat exchanger, a first expansion valve, and a second heat exchanger are sequentially connected, the first refrigerant having a property of disproportionation, the first refrigerant having a smaller composition ratio in the zeotropic refrigerant mixture in the compressor than a composition ratio of the first refrigerant in the zeotropic refrigerant mixture passing through the main passage.

Advantageous Effect of Invention

The refrigeration cycle apparatus of the embodiment of the present invention has a zeotropic refrigerant mixture of the low-boiling first refrigerant that is likely to cause disproportionation alone and the high-boiling second refrigerant. This can reduce the composition ratio of the first refrigerant particularly in the compressor where the refrigerant is likely to cause disproportionation, achieving the high-performance refrigeration cycle apparatus that can suppress disproportionation by reducing the partial pressure of the first refrigerant.

DESCRIPTION OF EMBODIMENTS

Embodiments of the present invention will be described below with reference to the accompanying drawings.

The following configurations are merely exemplary and thus a refrigeration cycle apparatus according to the present invention is not limited to the configurations.

Detailed structures are optionally simplified or omitted.

Moreover, redundant and similar explanations are optionally simplified or omitted.

First Embodiment

The configuration of a refrigeration cycle apparatus will be first discussed below.

Figure 1:
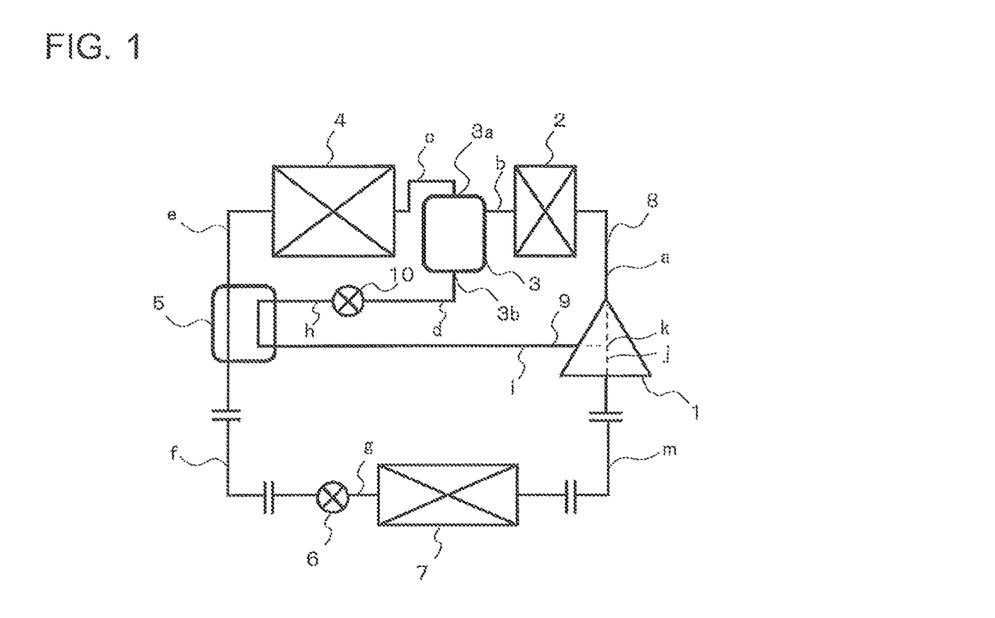
FIG. 1 is a schematic diagram of a refrigeration cycle apparatus according to a first embodiment.

FIG. 1 is a schematic diagram of the refrigeration cycle apparatus according to a first embodiment.

As shown in FIG. 1, the refrigeration cycle apparatus according to the first embodiment has a refrigeration cycle including a compressor 1, a first condenser 2, a liquid separator 3, a second condenser 4, a refrigerant heat exchanger 5, a first expansion valve 6, and an evaporator 7 that are sequentially connected via a refrigerant pipe serving as a main passage 8. A gas outlet 3a provided to an upper part of the liquid separator 3 is connected to the second condenser 4.

A liquid outlet 3b provided to a lower part of the liquid separator 3 is connected to the compressor 1 via a bypass 9. The bypass 9 is connected to an intermediate pressure part (an intermediate pressure between a high pressure and a low pressure, will be referred to as a medium pressure) in a compression chamber. The bypass 9 has a second expansion valve 10 and the refrigerant heat exchanger 5. The high-pressure (high temperature) side of the refrigerant heat exchanger 5 is connected between the second condenser 4 and the first expansion valve 6 on the main passage 8 while the medium-pressure (medium temperature) side of the refrigerant heat exchanger 5 is connected between the second expansion valve 10 and the compressor 1 on the bypass 9.

Working refrigerant for the refrigeration cycle apparatus according to the first embodiment is a zeotropic refrigerant mixture containing first refrigerant and second refrigerant. At high temperatures and high pressures, the first refrigerant is likely to cause disproportionation by a certain amount of energy applied thereto. The second refrigerant is less likely to cause disproportionation under the same conditions as the first refrigerant (or does not cause disproportionation under the same conditions). In other words, the first refrigerant is likely to cause disproportionation under the same specific conditions (high temperatures and high pressures) as a pressure and a temperature where the second refrigerant does not cause disproportionation. Moreover, the second refrigerant has a higher boiling point (is less likely to evaporate) than the first refrigerant at the same pressure.

The first refrigerant receives the certain amount of energy mainly in the compressor. An electrical path to a motor is placed in an atmosphere of refrigerant that may apply the electric energy of the electrical path to the refrigerant through a short circuit or electric leakage. In the compressor, frictional heat is constantly generated from a compression unit, a sliding unit, a bearing, and other components and is applied as energy to the refrigerant. Energy is particularly likely to be supplied to the refrigerant when the motor is damaged by any cause, though such energy supply can occur under a normal situation in operation of the compressor.

For example, the first refrigerant may be HFO1123 and disproportionation needs to be expected. The second refrigerant may be, for example, R32, HFO1234yf, HFO1234ze, and other refrigerants. Generally, refrigerating machine oil in refrigerant contains an addition agent. The first refrigerant contains monocyclic monoterpenoid as a reaction inhibitor. The monocyclic monoterpenoid is, for example, limonene.

It is known that the first refrigerant with a molar ratio of 70% or less is likely to suppress reactions. Furthermore, the second refrigerant may be of two or more kinds of refrigerant. However, the second refrigerant needs to have a higher boiling point than the first refrigerant.

The operation of refrigerant will be discussed below. Refrigerant discharged from the compressor 1 is high-temperature high-pressure gas refrigerant that is condensed into two-phase refrigerant with a high pressure through heat exchange with water or air in the first condenser 2. Gas refrigerant separated in the liquid separator 3 is discharged from the gas outlet 3a, flows into the second condenser 4, and then is condensed again into high-pressure liquid refrigerant through heat exchange with water or air. The liquid refrigerant discharged from the second condenser 4 flows into the refrigerant heat exchanger 5 and is further cooled into a subcooled liquid state through heat exchange with medium-pressure two-phase refrigerant passing through the bypass 9, and then the refrigerant is decompressed into low-pressure two-phase refrigerant by the first expansion valve 6. The refrigerant evaporated into low-pressure gas refrigerant through heat exchange with air or water in the evaporator 7 and then is sucked into the compressor 1 again. The liquid refrigerant separated in the liquid separator 3 is discharged from the liquid outlet 3b, is decompressed by the second expansion valve 10, is heated and evaporated into medium-pressure gas refrigerant in the refrigerant heat exchanger 5, and then is sucked into the compressor 1.

Refrigerant passing through the main passage 8 will be referred to as main refrigerant of the present invention while refrigerant passing through the bypass 9 will be referred to as bypass refrigerant.

The operation of the refrigeration cycle apparatus according to the embodiment will be described below.

In the configuration of the refrigeration cycle apparatus, two-phase refrigerant flowing into the liquid separator 3 is separated into gaseous and liquid phases. Since the first refrigerant has a lower boiling point than the second refrigerant (is more likely to be evaporated), the first refrigerant has a high composition ratio in the gaseous phase and has a low composition ratio in the liquid phase to the refrigerant mixture. Thus, in the main passage 8 from the second condenser 4, the first expansion valve 6, and the evaporator 7 to the compressor 1, the first refrigerant that is a low temperature boiling component has a high composition ratio. Low boiling temperature refrigerant typically has good performance and thus yields the performance of the refrigeration cycle apparatus according to the first embodiment.

Moreover, liquid refrigerant discharged from the liquid separator 3 passes through the bypass 9 where the first refrigerant has a low composition ratio, and then the refrigerant is sucked into the compressor 1. In the compressor 1, the main passage 8 and the bypass 9 join to mix the refrigerant of the bypass 9, in which the first refrigerant has a low composition ratio, with the refrigerant of the main passage 8. Thus, the first refrigerant at the joint and the subsequent passage has a smaller composition ratio than in the main passage 8.

Figure 2:
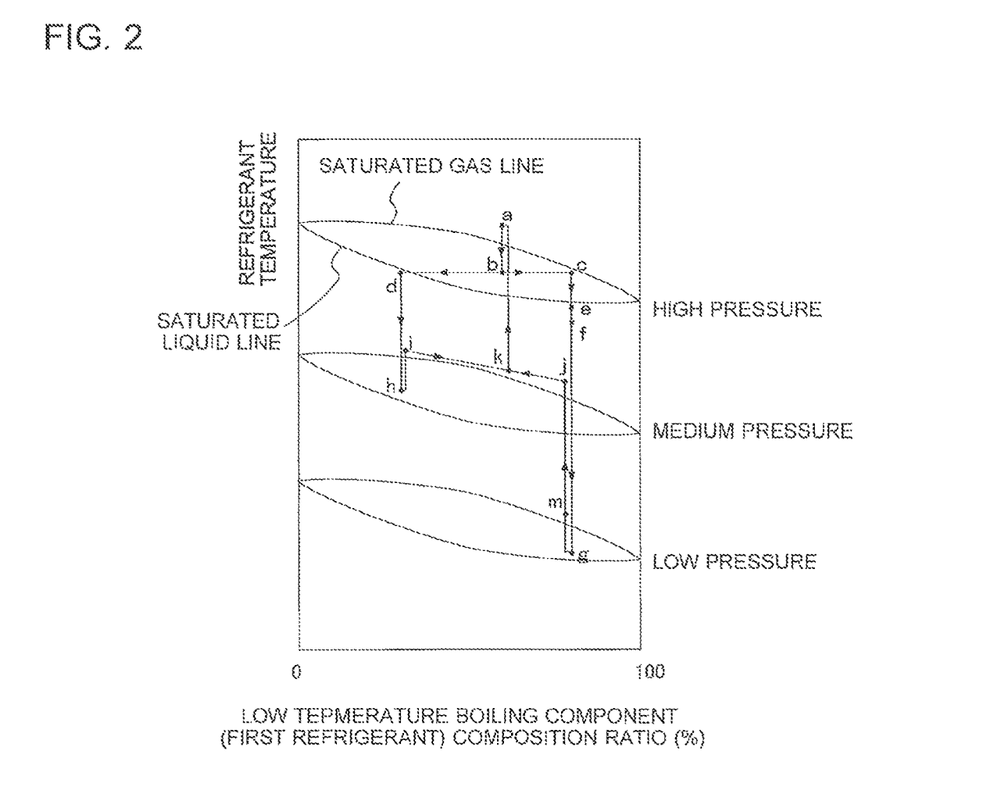
FIG. 2 is a temperature-composition diagram of a zeotropic refrigerant mixture at a high pressure, an intermediate pressure, and a low pressure in the refrigeration cycle apparatus according to the first embodiment.

Referring to FIG. 2, the states of refrigerant in the refrigeration cycle apparatus will be described below.

FIG. 2 is a temperature-composition diagram of the zeotropic refrigerant mixture at a high pressure, an intermediate pressure, and a low pressure in the refrigeration cycle apparatus according to the first embodiment.

In the case of the zeotropic refrigerant mixture, as shown in FIG. 2, the temperature-composition diagram forms lens shapes, each having an upper saturated gas line and a lower saturated liquid line. The diagram shows the pressures and temperatures of each part of the refrigeration cycle apparatus.

Gas refrigerant a having a high pressure at the outlet of the compressor 1 is placed in a partially condensed state b in the first condenser 2 and then is separated into gas refrigerant c and liquid refrigerant d in the liquid separator 3. The gas refrigerant c containing a large amount of first refrigerant (low temperature boiling component) is condensed into liquid in a state e by the second condenser 4 and is subcooled to a state f by the refrigerant heat exchanger 5. After that, the refrigerant is decompressed to a low-pressure two-phase state g by the first expansion valve 6.

The liquid refrigerant d containing a large amount of the second refrigerant (high boiling temperature component) separated in the liquid separator 3 is decompressed to an intermediate pressure in a state h by the second expansion valve 10. The refrigerant h at the intermediate pressure exchanges heat with the refrigerant e containing a large amount of the first refrigerant (low temperature boiling component), at the refrigerant-refrigerant heat exchanger is evaporated at a higher temperature in a state i, and then injected into the compressor 11 through the bypass 9.

The refrigerant flowing with the two-phase state g from the first expansion valve 6 is evaporated in the evaporator 7 into a superheated gas state m, is sucked into the compressor 1, and is compressed to an intermediate-pressure gas state j. Although a state in the compressor 1 is not shown; the gas refrigerant in the state j is mixed with the refrigerant i, which is introduced from the bypass 9, into gas refrigerant in a state K and then is compressed into outlet refrigerant a of the compressor 1.

As shown in FIG. 2, a refrigerant state line (c→e→f-→g→m→j) of the main passage 8 forms a high-performance refrigeration cycle where a low temperature boiling component (first refrigerant) has a high composition ratio. On a refrigerant state line (d→h→i) of the bypass 9, the low temperature boiling component (first refrigerant) has a low composition ratio. The refrigerant is joined to the refrigerant of the main passage 8 in the compressor 1, thereby reducing the composition ratio of the first refrigerant in the compressor 1 (j→k).

The advantage of the refrigeration cycle apparatus according to the present embodiment will be described below.

At high temperatures and high pressures, the first refrigerant may continuously cause disproportionation by a certain amount of energy applied thereto. In the compressor 1, the refrigerant reaches a high temperature and a high pressure and is likely to cause local energy in the sliding unit, a power receiving unit, a motor, and other components, requiring maximum safety in the refrigeration cycle apparatus.

In the refrigeration cycle apparatus according to the first embodiment, the first refrigerant is a low boiling temperature refrigerant that is likely to cause disproportionation when used alone, and the first refrigerant is mixed with the second refrigerant, which is a high-temperature boiling refrigerant, into the zeotropic refrigerant mixture. Thus, the composition ratio of the first refrigerant can be reduced in the compressor where the refrigerant is particularly likely to cause disproportionation, and disproportionation can be suppressed by reducing the partial pressure of the first refrigerant, thereby achieving the high-performance refrigeration cycle apparatus.

Since the refrigerant of the bypass 9 is returned to the intermediate pressure part in the compressor 1, the input of the compressor 1 can be reduced.

This effect is greater than the effect of simply mixing another refrigerant with the first refrigerant to reduce the partial pressure of the first refrigerant (according to a filler composition ratio) and suppress reactions.

Since the first refrigerant is a low boiling temperature refrigerant, discharge gas may have a high temperature as a physical property. The first refrigerant having a low composition ratio in the compressor 1 can suppress the temperature of discharged gas. This can improve the reliability of the compressor 1 and suppress reactions.

The bypass 9 may be connected to the suction pipe of the compressor 1. With this configuration, the compressor 1 has a low pressure shell or a high pressure shell. In either case, the first refrigerant can have a low composition ratio to the whole refrigerant mixture around a glass terminal or the motor, effectively preventing reactions.

Moreover, the opening degree of the second expansion valve 10 may be increased with increase of a temperature and a pressure in the compressor 1 or discharged refrigerant (the probability of reactions). This can reduce the composition ratio of the first refrigerant in the compressor 1 to suppress disproportionation.

If water or air that exchanges heat with refrigerant has a high temperature in the first condenser 2 and the second condenser 4, a refrigerant temperature (the saturation temperature of a condensing pressure) increases in each of the condensers. At this time, the first refrigerant (e.g., HFO1123) has a low critical temperature and thus the outlet of the second condenser 4 is unlikely to be subcooled. However, subcooling can be provided by the refrigerant heat exchanger 5 and thus the disadvantage of refrigerant having a low critical temperature can be overcome.

During an operation of the refrigeration cycle apparatus according to the first embodiment, liquid refrigerant containing the first refrigerant having a low composition ratio is present in the first condenser 2 and the liquid separator 3. When the refrigeration cycle apparatus is restarted from this state after being stopped, the refrigerant containing the first refrigerant having a low composition ratio can be reliably supplied to the compressor 1 from the liquid separator 3 through the bypass 9. The refrigerant containing the first refrigerant at a low composition ratio to the refrigerant mixture is supplied to the compressor 1 that is damaged at startup and thus is likely to generate local energy. This suppresses disproportionation.

Similarly, the opening degree of the second expansion valve 10 at the start of the compressor 1 is set larger than that during a normal operation (e.g., a maximum opening degree), thereby further suppressing disproportionation of the first refrigerant at startup.

Alternatively, before the refrigeration cycle apparatus is stopped, the opening degree of the second expansion valve 10 is set smaller than that during a normal operation, allowing the liquid separator 3 to retain a large amount of liquid refrigerant containing the first refrigerant having a low composition ratio. Thus, the refrigerant containing the first refrigerant having a low composition ratio can be reliably supplied to the compressor 1 at the next restart.

Refrigerant prone to cause reaction like the first refrigerant of the first embodiment is likely to react with a foreign matter to form a reaction product (sludge). Thus, an air conditioning system may be used in which heat is exchanged with water or brine acting as a heating medium in the heat exchangers of the refrigeration cycle apparatus and the heating medium is transported to the load-side heat exchanger (chiller or secondary loop system). In such an air conditioning system, the pipes of the refrigeration cycle apparatus are not constructed on-site, thereby considerably saving control, for example, control of foreign matters for refrigerant, moisture control, and air control. This can suppress the reaction of the first refrigerant.

In the refrigeration cycle apparatus according to the first embodiment, the first refrigerant and the second refrigerant are mixed. Three or more kinds of refrigerant may be mixed instead. In this case, the first refrigerant needs to belong to a low temperature boiling component. In this composition, the refrigerant of the main passage contains the first refrigerant having a high composition ratio, whereas the refrigerant of the bypass contains the first refrigerant having a low composition ratio, thereby achieving the same effect of suppressing reactions.

Second Embodiment

The configuration of a refrigeration cycle apparatus will be first described below.

The working refrigerant of the refrigeration cycle apparatus according to a second embodiment is identical to that of the first embodiment and thus differences in configuration will be discussed below.

Figure 3:
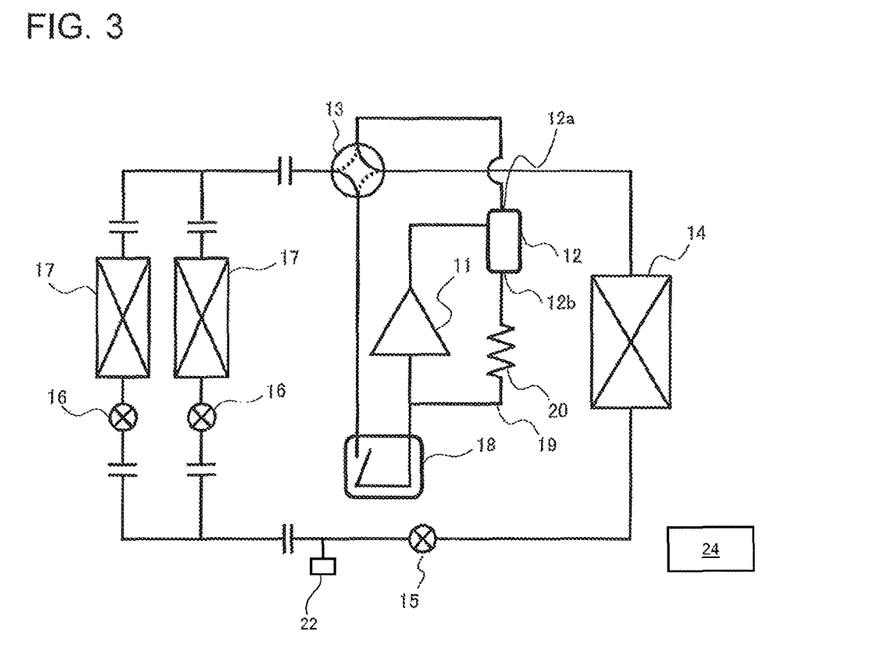
FIG. 3 is a schematic diagram of a refrigeration cycle apparatus according to a second embodiment.

FIG. 3 is a schematic diagram of the refrigeration cycle apparatus according to the second embodiment.

The refrigeration cycle apparatus according to the second embodiment has a refrigeration cycle including a compressor 11, an oil separator 12, a four-way valve 13, an exterior heat exchanger 14, an exterior expansion valve 15, interior expansion valves 16, interior heat exchangers 17, the four-way valve 13, and an accumulator 18 that are sequentially connected. The interior expansion valves 16 and the interior heat exchangers 17 are connected in parallel. A gas outlet 12a of the oil separator 12 is connected to the four-way valve 13. An oil return port 12b of the oil separator 12 is connected to a compressor 1 via a bypass 19. The bypass 19 has a constriction 20.

The working refrigerant of the refrigeration cycle apparatus is a zeotropic refrigerant mixture of first refrigerant and second refrigerant as in the first embodiment.

The action of refrigerant will be discussed below.

A cooling operation will be first discussed below. The four-way valve 13 in FIG. 3 is operated while being connected as indicated by solid lines. Refrigerant discharged from the compressor 11 flows as high-temperature high-pressure gas refrigerant into the oil separator 12 along with a portion of refrigerating machine oil in the compressor 11. The refrigerant in the oil separator 12 is separated into gas refrigerant and refrigerating machine oil. The gas refrigerant passes through the four-way valve 13 and is condensed into high-pressure liquid refrigerant through heat exchange with water or air in the exterior heat exchanger 14 (condenser). The liquid refrigerant is decompressed into low-pressure two-phase refrigerant at least in one of the exterior expansion valve 15 and the interior expansion valve 16. Subsequently, the refrigerant is evaporated into low-pressure gas refrigerant through heat exchange with air or water in the interior heat exchangers 17 (evaporators), passes through the four-way valve 13 and the accumulator 18, and then is sucked into the compressor 1 again. The refrigerating machine oil separated in the oil separator 12 passes through the bypass 19 and the constriction 20 from the oil return port 12b and then is sucked into the compressor 11.

A heating operation will be discussed below. The four-way valve 13 in FIG. 3 is operated while being connected as indicated by broken lines. Refrigerant discharged from the compressor 11 flows as high-temperature high-pressure gas refrigerant into the oil separator 12 along with a portion of refrigerating machine oil in the compressor 11. The refrigerant in the oil separator 12 is separated into gas refrigerant and refrigerating machine oil. The gas refrigerant passes through the four-way valve 13 and is condensed into high-pressure liquid refrigerant through heat exchange with water or air in the interior heat exchangers 17 (condensers), The liquid refrigerant is decompressed into low-pressure two-phase refrigerant at least in one of the exterior expansion valve 15 and the interior expansion valve 16. Subsequently, the refrigerant is evaporated into low-pressure gas refrigerant through heat exchange with air or water in the exterior heat exchanger 14 (evaporator), passes through the four-way valve 13 and the accumulator 18, and then is sucked into the compressor 1 again. The refrigerating machine oil separated in the oil separator 12 passes through the bypass 19 and the constriction 20 from the oil return port 12b and then is sucked into the compressor 11.

The operations of the expansion valves will be discussed below. The interior expansion valve 16 properly adjusts a flow rate of refrigerant for each indoor unit (according to the load of the indoor unit). The opening degree of the interior expansion valve 16 is adjusted according to a difference between the temperature of sucked room air and a set temperature, the degree of superheat of refrigerant at the outlet of the evaporator (=evaporator outlet refrigerant temperature−evaporating temperature) during a cooling operation, the degree of superheat of refrigerant at the outlet of the condenser (=condensing temperature−condenser outlet refrigerant temperature) during a heating operation, or other indexes of heat exchanger performance.

The exterior expansion valve 15 adjusts the opening degree (the control of the opening degree will be specifically discussed later) to predetermined opening degrees for respective operating conditions or adjusts the opening degree such that an intermediate pressure between the interior expansion valve 16 and the exterior expansion valve 15 reaches a predetermined medium pressure (saturation temperature).

The operation of the refrigeration cycle apparatus according to the embodiment will be described below.

In the oil separator 12, flowing gas refrigerant and refrigerating machine oil are separated from each other. At this point, the first refrigerant has a lower boiling point (is more likely to evaporate) than the second refrigerant and thus the first refrigerant has a low composition ratio in refrigerant dissolved in refrigerating machine oil. This allows the first refrigerant that is a low temperature boiling component to have a high composition ratio in a main passage 21 passing through the four-way valve 13, the exterior heat exchanger 14, and the interior heat exchangers 17. Low boiling temperature refrigerant typically has good performance and thus improves the performance of the refrigeration cycle apparatus according to the second embodiment.

Moreover, refrigerating machine oil circulates through the compressor 11, the oil separator 12, the bypass 19, and the compressor 11 and forms a large proportion in the compressor 11.

Refrigerating machine oil discharged from the oil return port 12b of the oil separator 12 and refrigerant dissolved in refrigeration oil are sucked into the compressor 1 through the bypass 19 with the first refrigerant having a low composition ratio. The main passage 21 and the bypass 19 join at the suction pipe of the compressor 11 to mix the refrigerant of the bypass 19, in which the first refrigerant has a low composition ratio, with the refrigerant of the main passage 21. Thus, the first refrigerant at the joint and the subsequent passage has a smaller composition ratio than in the main passage 21.

The effect of the refrigeration cycle apparatus according to the present embodiment will be described below.

A certain amount of energy applied to the first refrigerant at high temperatures and high pressures may continuously cause disproportionation. In the compressor 11, the refrigerant reaches a high temperature and a high pressure and is likely to cause local energy in a sliding unit, a power receiving unit, a motor, and other components, requiring maximum safety in the refrigeration cycle apparatus.

In the refrigeration cycle apparatus according to the second embodiment, the configuration can reduce the composition ratio of the first refrigerant in the compressor 11, reduce the partial pressure of the first refrigerant, and suppress chain reactions. Since the bypass 19 joins to the suction pipe of the compressor 11, the composition ratio of the first refrigerant can be reduced around a glass terminal and a motor for the compressor 11 having a low-pressure or high-pressure shell, thereby effectively preventing reactions.

If the opening degree of the constriction 20 can be adjusted like the expansion valve, the opening degree of the constriction 20 is increased when a high temperature and a high pressure occurred in the compressor 11 or the discharged refrigerant (a reaction is likely to occur). Thus, the composition ratio of the first refrigerant in the compressor 11 is reduced to suppress disproportionation. The composition ratio of the first refrigerant in the compressor 11 is reduced only on the condition that disproportionation is likely to occur. This can reduce an unnecessary bypass of refrigerating machine oil from the oil separator 12 and improve the performance of the refrigeration cycle apparatus.

During an operation of the refrigeration cycle apparatus according to the second embodiment, liquid refrigerant containing the first refrigerant having a low composition ratio is dissolved in refrigerating machine oil in the oil separator 12 and the compressor 11. At the restart of the refrigeration cycle apparatus having been stopped from this state, the refrigerant containing the first refrigerant having a low composition ratio is reliably supplied from the oil separator 12 to the compressor 11 through the bypass 19. The refrigerant containing the first refrigerant having a low composition ratio is supplied to the compressor 11 that is likely to be damaged at startup to generate local energy, thereby suppressing reactions.

Similarly, the opening degree of the constriction 20 at the startup of the compressor 11 is set larger than that of a normal operation (e.g., a maximum opening degree), thereby further suppressing disproportionation of the first refrigerant at the startup.

The control of the opening degree of the exterior expansion valve 15 will be described below, which increases required amounts of refrigerant during a cooling operation.

During a cooling operation, connecting pipes among the exterior heat exchanger 14 acting as a condenser, the exterior expansion valve 15, and the interior expansion valves 16 contain liquid refrigerant and refrigerant (high-density refrigerant) having a low degree of dryness, which substantially determines a required amount of refrigerant. During a heating operation, connecting pipes among the interior heat exchangers 17 acting as condensers, the exterior expansion valve 15, and the interior expansion valves 16 contain liquid refrigerant and refrigerant (high-density refrigerant) having a low degree of dryness, which substantially determines a required amount of refrigerant. Typically, a required amount of refrigerant differs between a cooling operation and a heating operation and a difference in required amount is retained as surplus refrigerant in the refrigeration cycle apparatus.

In the case of surplus refrigerant in a passage from the outlet of the evaporator to the compressor 11 (e.g., in the accumulator), liquid refrigerant contains the first refrigerant having a low composition ratio and thus the first refrigerant in circulating refrigerant has a high composition ratio. Hence, the target value of the exterior expansion valve 15 is set to reduce surplus refrigerant. This can reduce the amount of surplus refrigerant and the composition ratio of the first refrigerant circulating the main passage 21, thereby suppressing the reaction of refrigerant.

For example, when the opening degree of the exterior expansion valve 15 is reduced during a heating operation, an intermediate pressure increases (higher density) in pipes between the exterior expansion valve 15 and the interior expansion valves 16, thereby increasing a required amount of refrigerant. Conversely, when the opening degree is increased, an intermediate pressure decreases (lower density) in pipes between the exterior expansion valve 15 and the interior expansion valves 16, thereby reducing a required amount of refrigerant.

When the opening degree of the exterior expansion valve 15 is increased during a cooling operation, an intermediate pressure increases (higher density) in pipes between the exterior expansion valve 15 and the interior expansion valves 16, thereby increasing a required amount of refrigerant. Conversely, when the opening degree is reduced, an intermediate pressure decreases (lower density) in pipes between the exterior expansion valve 15 and the interior expansion valves 16, thereby reducing a required amount of refrigerant.

Even when the opening degree of the exterior expansion valve 15 is changed, the opening degree of the interior expansion valve 16 is independently adjusted, thereby supplying a proper flow rate of refrigerant to each indoor unit according to a load.

Thus, the control target value of the exterior expansion valve 15 is properly set during a cooling operation and a heating operation. This can increase a required amount of refrigerant in the pipes having an intermediate pressure in the refrigeration cycle apparatus, and reduce surplus refrigerant.

In the following explanation, the total internal volume of the exterior heat exchanger is larger than that of the interior heat exchanger. In this case, the exterior heat exchanger acting as a condenser during a cooling operation contains a larger amount of refrigerant than the interior heat exchanger acting as a condenser during a heating operation. To prevent the occurrence of surplus refrigerant (an equal amount of refrigerant required in cooling and heating), a density (pressure) in the pipes between the exterior expansion valve and the interior expansion valves needs to be reduced during a cooling operation and needs to be increased during a heating operation. In other words, the opening degree of the exterior expansion valve is reduced during a cooling operation and is increased during a heating operation to keep constant a required amount of refrigerant during cooling and heating. The target of control may be the opening degree of the exterior expansion valve. Moreover, a pressure sensor 22 may be provided to detect a pressure at a position between the exterior expansion valve and the interior expansion valve, a temperature sensor may be provided to calculate the saturation pressure of the sensor with a controller 24, and a pressure target value may be determined to operate the opening degree of the exterior expansion valve such that a required amount of refrigerant is kept constant during cooling and heating.

In the case where the amount of surplus refrigerant cannot be adjusted only by the exterior expansion valve 15, the degree of subcooling at the outlet of the condenser is increased or reduced to adjust the amount of refrigerant in the condenser. This can increase an adjustment range and reliably reduce surplus refrigerant.

The expansion valve is adjusted to increase a required amount of refrigerant circulating through the refrigeration cycle apparatus, and surplus refrigerant is reduced between the outlet of the evaporator and the compressor 11 (including the interior of the compressor). This prevents an increase in the composition ratio of the first refrigerant in the compressor 11 to suppress reactions.

Third Embodiment

The configuration of a refrigeration cycle apparatus will be first described below.

The working refrigerant of the refrigeration cycle apparatus according to a third embodiment is identical to that of the first embodiment and thus differences in configuration will be discussed below.

Figure 4:
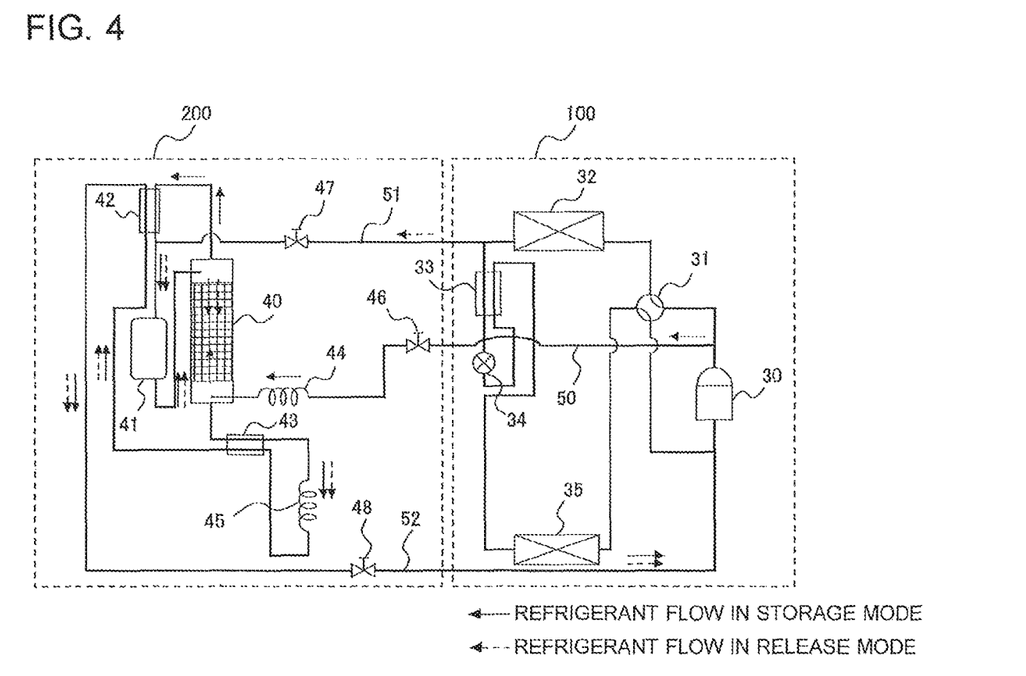
FIG. 4 is a schematic diagram of a refrigeration cycle apparatus according to a third embodiment.

FIG. 4 is a schematic diagram of the refrigeration cycle apparatus according to the third embodiment.

As shown in FIG. 4, the refrigeration cycle apparatus according to the third embodiment includes a compressor 30, a four-way valve 31, a user-side heat exchanger 32, a subcooler 33, an expansion valve 34 acting as a first decompression device, and a heat-source-side heat exchanger 35. These components are sequentially connected via refrigerant pipes and are stored in a refrigeration cycle unit 100.

A component separation circuit includes a refrigerant rectifier 40 acting as a component separating unit, a refrigerant reservoir 41 for retaining refrigerant, a first cooler 42, a second cooler 43, a capillary tube 44 acting as a second decompression device, a capillary tube 45 acting as a third decompression device, a first solenoid valve 46 acting as an on-off valve, a second solenoid valve 47, and a third solenoid valve 48. The first cooler 42 and the refrigerant reservoir 41 are shaped like rings connected to the upper part of the refrigerant rectifier 40. These components are stored in a component separation unit 200.

The refrigeration cycle unit 100 and the component separation unit 200 are connected via three pipes: a first pipe 50, a second pipe 51, and a third pipe 52 and are configured to change the composition ratio of refrigerant circulating through a refrigerant circuit.

The refrigeration cycle apparatus contains a zeotropic refrigerant mixture of standard composition with a specific composition ratio, the zeotropic refrigerant mixture containing two components: a low temperature boiling component (e.g., HFO1123) serving as first refrigerant and a high boiling temperature component (e.g., HFO1234yf) serving as second refrigerant.

The refrigerant rectifier 40 contains a filler for increasing the contact area of gas and liquid. The discharge-side pipe of the compressor 30 connects the compressor 30 and the four-way valve 31 and connects to the lower part of the refrigerant rectifier 40 via the first pipe 50 passing through the first solenoid valve 46 and the capillary tube 44.

The outlet side of the user-side heat exchanger 32 is connected to a pipe connecting the first cooler 42 and the refrigerant reservoir 41, via the second pipe 51 passing through the second solenoid valve 47.

Furthermore, the suction side pipe of the compressor 30 and the lower part of the refrigerant rectifier 40 are connected via the third pipe 52 passing through the third solenoid valve 48 and the capillary tube 45.

The refrigeration cycle apparatus and the component separation circuit stored in the refrigeration cycle unit 100 and the component separation unit 200, respectively, are connected via the first pipe 50, the second pipe 51, and the third pipe 52. When the component separation unit 200 is connected to the existing refrigeration cycle unit 100, the existing refrigeration cycle unit 100 is not considerably changed and the number of connections is small, facilitating the subsequent connection.

Moreover, in the component separation circuit, the refrigerant rectifier 40 is connected to the high-pressure side and the low-pressure side of the refrigeration cycle apparatus via the capillary tube 44 acting as a second decompression device and the capillary tube 45 acting as a third decompression device, allowing the refrigerant rectifier 40 to operate with an intermediate pressure. Thus, a difference between liquid composition and gas composition is larger (more zeotropic) than in a high-pressure operation, thereby increasing separation efficiency (proportionate to a concentration difference between liquid and gas).

The operation of the refrigeration cycle apparatus configured thus according to the third embodiment is exemplified by a heat-pump water heater.

In the heat-pump water heater, the user-side heat exchanger 32 is driven as a water heat exchanger and the heat-source-side heat exchanger 35 is driven as air heat exchanger. In this case, the heat-source-side heat exchanger 35 is operated as an evaporator and the user-side heat exchanger 32 is operated as a condenser. Cold water flowing as a heated medium into the user-side heat exchanger 32 is heated into warm water by latent heat of refrigerant condensation and then is supplied to a hot water storage tank or other tanks. Air flowing as a cooled medium into the heat-source-side heat exchanger 35 is cooled by latent heat of refrigerant vaporization and then is discharged to outside air or other atmospheres.

In the heat-pump water heater, the refrigeration cycle apparatus is operated at night and water is supplied by a pump (not shown) to the water heat exchanger of the user-side heat exchanger 32 from the hot water storage tank (not shown) containing supplied tap water, and then the water is heated to boil in the hot water storage tank.

A user mixes the hot water from the hot water storage tank with feed water (tap water) and uses the mixed water at an appropriate temperature. The amount of hot water in the hot water storage tank decreases as the amount of used water increases. The tank is not replenished with water (fed with water) in the daytime before reaching a drought water level. At a drought water level, hot water at about 55 degrees C. is stored in the hot water storage tank with circulating refrigerant having the standard composition or a small amount of hot water at 70 degrees C. is stored with a composition ratio of an increased amount of the second refrigerant (high boiling temperature component). These conditions are properly selected to reheat the water.

In the following operation, the composition ratio of refrigerant is changed (corresponding to the separation-storage mode of the present invention) or the composition ratio of refrigerant is returned to the standard composition (corresponding to the release mode of the present invention) in the refrigeration cycle apparatus of the third embodiment.

In the water heater of the present embodiment, the composition of refrigerant circulating in the refrigeration cycle apparatus can be changed. For example, the composition ratio of the second refrigerant (high boiling temperature component) is increased to suppress an increase in pressure, allowing hot water supply. Moreover, the composition ratio of the first refrigerant (low temperature boiling component) is returned to the standard composition of the refrigeration cycle apparatus, thereby improving low-temperature heating capability.

For example, for quickly raising a water temperature at the start of hot water supply, the circulating refrigerant of the refrigeration cycle apparatus with the standard composition improves the low-temperature hating capability. When the hot water storage tank reaches a certain temperature (e.g., 55 degrees C.), the composition ratio of the second refrigerant (high boiling temperature component) of the circulating refrigerant is increased to heat water to a high temperature (e.g., 70 degrees C.). After that, the temperature of water in the hot water storage tank is kept. To compensate for a temperature decrease caused by a thermal loss from a high temperature (e.g., 70 degrees C.), the refrigeration cycle apparatus can be operated with the composition ratio of increased second refrigerant (high boiling temperature component).

An operation of changing the composition ratio of refrigerant circulating in the refrigeration cycle apparatus (separation-storage mode) will be first discussed below.

In the separation-storage mode during hot water supply, an operation is performed to increase high boiling temperature components (second refrigerant) in the composition of refrigerant circulating in the refrigeration cycle apparatus.

The four-way valve 31 connected as indicated by solid lines connects the discharging part of the compressor 30 and the inlet part of the user-side heat exchanger 32 and connects the outlet part of the heat-source-side heat exchanger 35 and the suction part of the compressor 30. The first solenoid valve 46 of the first pipe 50 and the third solenoid valve 48 of the third pipe 52 are opened while the second solenoid valve 47 of the second pipe 51 is closed.

At this point, high-pressure gas refrigerant from the compressor 30 partially passes through the first solenoid valve 46, is decompressed to an intermediate pressure in the capillary tube 44 acting as the second decompression device provided at the inlet of the lower part of the refrigerant rectifier 40, and then the gas refrigerant flows into the lower part of the refrigerant rectifier 40 and partially rises in the refrigerant rectifier 40.

On the upper part of the refrigerant rectifier 40, rising refrigerant steam flows into the first cooler 42 and is cooled into condensate liquid by low-pressure two-phase gas-liquid refrigerant flowing out of the capillary tube 45 acting as the third decompression device connected to the lower part of the refrigerant rectifier 40. The condensed and liquefied refrigerant flows into the refrigerant reservoir 41 and is stored therein. A flow of liquid refrigerant is gradually accumulated in the refrigerant reservoir 41 and liquid refrigerant overflowing the refrigerant reservoir 41 flows into the upper part of the refrigerant rectifier 40 as reflux to the refrigerant rectifier 40.

In this state, rising steam refrigerant and falling liquid refrigerant come into gas-liquid contact and move heat and substances in the refrigerant rectifier 40. So-called rectification gradually increases low temperature boiling components (first refrigerant) in steam refrigerant rising in the refrigerant rectifier 40 and gradually increases low temperature boiling components (first refrigerant) in liquid refrigerant stored in the refrigerant reservoir 41.

Subsequently, refrigerant containing a large amount of rectified high boiling temperature components (second refrigerant) flows from the lower part of the refrigerant rectifier 40. The two-phase gas-liquid refrigerant having an intermediate pressure flows into the second cooler 43 and is liquefied therein, is decompressed into low-pressure two-phase gas-liquid refrigerant through the capillary tube 45 acting as the third decompression device, and is returned to the second cooler 43. The refrigerant completely liquefies, in the second cooler 43, the two-phase gas-liquid refrigerant (subcooling state) having flown from the lower part of the refrigerant rectifier 40, and then is cooled into low-pressure two-phase (or steam) refrigerant. Subsequently, the low-pressure two-phase (or steam) refrigerant flows into the first cooler 42, cools and liquefies the refrigerant steam of the first refrigerant (low temperature boiling component) flowing out of the refrigerant rectifier 40, passes through the third pipe 52, and then flows into the inlet part of the compressor 30. This reduces low temperature boiling components (first refrigerant) and high boiling temperature components (second refrigerant) in the composition of refrigerant circulating in the refrigeration cycle apparatus.

An operation of returning, to the standard composition, the composition ratio of refrigerant circulating in the refrigeration cycle apparatus (release mode) will be discussed below.

In the release mode, the four-way valve 31 connected as indicated by solid lines connects the discharging part of the compressor 30 and the inlet part of the user-side heat exchanger 32 and connects the outlet part of the heat-source-side heat exchanger 35 and the suction part of the compressor 30. The first solenoid valve 46 of the first pipe 50 is closed while the second solenoid valve 47 of the second pipe 51 and the third solenoid valve 48 of the third pipe 52 are opened.

High-pressure gas refrigerant discharged from the compressor 30 passes through the four-way valve 31 and is condensed and liquefied into high-pressure liquid refrigerant in the user-side heat exchanger 32 acting as a condenser. The refrigerant is partially subcooled in the subcooler 33, is decompressed into low-pressure two-phase gas-liquid refrigerant by the expansion valve 34, and then flows into the heat-source-side heat exchanger 35 acting as an evaporator. The refrigerant is evaporated in the heat-source-side heat exchanger 35 and is sucked into the compressor 30 again through the four-way valve 31.

The other part of the high-pressure liquid refrigerant condensed in the user-side heat exchanger 32 passes through the second solenoid valve 47 of the second pipe 51, flows into the refrigerant rectifier 40 and the second cooler 43 through the refrigerant reservoir 41, is decompressed into low-pressure two-phase gas-liquid refrigerant in the capillary tube 45 acting as the third decompression device, and is sucked into the compressor 30 through the third pipe 52. Specifically, the first solenoid valve 46 is closed, the second solenoid valve 47 and the third solenoid valve 48 are opened, high-pressure liquid refrigerant flowing out of the user-side heat exchanger 32 causes refrigerant containing a large amount of high boiling temperature components (second refrigerant) in the refrigeration cycle apparatus to press liquid refrigerant containing a large amount of low temperature boiling components in the refrigerant reservoir 41 from the lower part of the refrigerant reservoir 41, and returns the refrigerant containing a large amount of low temperature boiling components (first refrigerant) into the refrigeration cycle apparatus, thereby returning the composition ratio of refrigerant to the standard composition.

The effect of the refrigeration cycle apparatus according to the present embodiment will be described below.

With this configuration, in the separation-storage mode, the refrigerant reservoir 41 stores liquid refrigerant containing a larger amount of low temperature boiling components (first refrigerant) than the refrigerant stored with the standard composition in the refrigeration cycle apparatus. The refrigerant can circulate with the composition ratio of a large amount of high boiling temperature components (second refrigerant) in the refrigeration cycle apparatus.

Refrigerant containing predetermined high boiling temperature components (second refrigerant) with a high composition ratio can suppress an increase in pressure on the high-pressure side during hot water supply, enabling hot water supply. Furthermore, a pressure increase on the high-pressure side is likely to cause disproportionation in the zeotropic refrigerant mixture but a reduction in the composition ratio of low boiling temperature refrigerant (first refrigerant) suppresses the probability of disproportionation.

In the composition ratio of refrigerant in the component separation unit 200, the composition of low boiling temperature refrigerant (first refrigerant) increases. However, the component separation unit 200 does not have a sliding unit or a power receiving unit that is provided in the compressor 30 and thus the first refrigerant is placed under the conditions that disproportionation is unlikely to occur, thereby achieving safety.

Subsequently, refrigerant contains predetermined high boiling temperature components (second refrigerant) having a high composition ratio in the refrigeration cycle apparatus, and then the first solenoid valve 46 and the third solenoid valve 48 are closed to perform an operation with a fixed composition ratio of the refrigerant.

When low-temperature water is armed at the start of usage of a water heater, high thermal capability is necessary. In this case, an operation is performed after the composition ratio of refrigerant in the refrigeration cycle apparatus is returned to the standard composition (filler composition) from the state of a large amount of high boiling temperature components (second refrigerant) in the release mode.

In the water heater, the composition ratio of refrigerant is adjusted by the component separation unit 200 according to a change of the temperature of supplied hot water. As in the first embodiment, the interior of the compressor 30 or the pressure or temperature of discharged refrigerant is measured. When a high temperature or a high pressure is measured (reaction is likely to occur), the component separation unit 200 can be operated in the separation-storage mode. On the condition that disproportionation is likely to occur in the working refrigerant, the first refrigerant is stored in the refrigerant reservoir 41, and refrigerant containing the second refrigerant having a high composition ratio is supplied to the suction side of the compressor 30. This can suppress the composition ratio of the first refrigerant in the compressor 30 and reduces disproportionation.

For a predetermined time before the compressor 30 of the refrigeration cycle apparatus is stopped, the first solenoid valve 46 and the third solenoid valve 48 are opened and the component separation unit 200 is operated in the separation-storage mode. Thus, liquid refrigerant containing the first refrigerant having a high composition ratio is stored in the refrigerant reservoir 41 and the refrigerant containing the first refrigerant having a low composition ratio is supplied to the compressor 30 that is damaged at restart and is likely to generate local energy, thereby reliably preventing disproportionation. Subsequently, the release mode is performed in response to a stable operation of the refrigeration cycle apparatus after the lapse of a certain time period from startup, and the composition ratio of the refrigerant of the refrigeration cycle apparatus is returned to the standard composition, thereby achieving thermal capability.

The third pipe 52 is connected to the suction pipe of the compressor 30. With this configuration, in either of the case where the compressor 30 has a low pressure shell or the case where it has a high pressure shell, the first refrigerant can have a low composition ratio to the whole refrigerant mixture around a glass terminal or the motor, effectively preventing reactions. Moreover, the connecting portion of the third pipe 52 injects the refrigerant midway in a compression stroke of the compressor 30, thereby reducing the composition ratio of the first refrigerant particularly at a high-pressure part in the compression stroke.

In the refrigeration cycle apparatus of the third embodiment, the configuration can reduce the composition of the first refrigerant near the refrigeration cycle unit 100 in the refrigeration cycle apparatus, reduce the partial pressure of the first refrigerant, and suppress the chain disproportionation of the first refrigerant.

In the third embodiment, the water heater was described as an example. The refrigeration cycle apparatus is applicable to an air conditioner, a chiller, and other devices.

In the refrigeration cycle apparatus according to the third embodiment, the first refrigerant and the second refrigerant are mixed. Three or more kinds of refrigerant may be mixed instead. In this case, the first refrigerant needs to belong to a low temperature boiling component. In this composition, the refrigerant of the main passage contains the first refrigerant having a high composition ratio, whereas the refrigerant of the bypass contains the first refrigerant having a low composition ratio, thereby achieving the same effect of suppressing reactions.

The first to third embodiments were described above. The present invention is not limited to the embodiments and at least some of the embodiments can be combined.

For example, the component separation unit 200 of the third embodiment can be used for the refrigeration cycle apparatus of the first or second embodiment to adjust the composition ratio of the first refrigerant in the refrigeration cycle apparatus. Moreover, the refrigeration cycle apparatus for the refrigeration cycle unit 100 of the third embodiment may be replaced with the refrigeration cycle apparatus of the first or second embodiment to constitute an air conditioning system.

REFERENCE SIGNS LIST compressor 2 first condenser 3 liquid separator 3a gas outlet 3b liquid outlet 4 second condenser (corresponding to a third heat exchanger of the present invention) 5 refrigerant heat exchanger 6 first expansion valve 7 evaporator 8 main passage 9 bypass 10 second expansion valve 11 compressor 12 oil separator 12a gas outlet 12b oil return port 13 four-way valve 14 exterior heat exchanger 15 exterior expansion valve (corresponding to a third expansion valve of the present invention) 16 interior expansion valve 17 interior heat exchanger 18 accumulator 19 bypass 20 constriction 21 main passage 30 compressor 31 four-way valve 32 user-side heat exchanger 33 subcooler 34 expansion valve 35 heat-source-side heat exchanger 40 refrigerant rectifier 41 refrigerant reservoir 42 first cooler 43 second cooler 44 capillary tube 45 capillary tube 46 first solenoid valve 47 second solenoid valve 48 third solenoid valve, 50 first pipe 51 second pipe 52 third pipe 100 refrigeration cycle unit 200 component separation unit

The invention claimed is:

1. A refrigeration cycle apparatus, comprising:
   a main passage in which a compressor, a first heat exchanger, a first expansion valve, and a second heat exchanger are sequentially connected operating with a working refrigerant being a zeotropic refrigerant mixture containing at least a first refrigerant and a second refrigerant having a higher boiling point than the first refrigerant at a same pressure, the first refrigerant having a property of disproportionation;

a second expansion valve disposed in series with the first expansion valve between the first heat exchanger and the second heat exchanger on the main passage;

a pressure sensor disposed between the first expansion valve and the second expansion valve configured to detect a pressure of the refrigerant; and a controller configured to control the refrigeration cycle apparatus, wherein the main passage includes an oil separator connected between the compressor and the first heat exchanger and configured to separate the zeotropic refrigerant mixture containing the first refrigerant at a composition ratio of the refrigerant mixture, the composition ratio being lower than a composition ratio of the first refrigerant in the zeotropic refrigerant mixture passing through the main passage, the zeotropic refrigerant mixture having the lower composition ratio of the first refrigerant and separated by the oil separator being supplied into the compressor from the oil separator through a bypass, and the controller is configured to control an opening degree of the second expansion valve such that a pressure in a refrigerant pipe between the first expansion valve and the second expansion valve detected by the pressure sensor is a predetermined target pressure value so as to decrease the composition ratio of the first refrigerant in the main passage, and control an opening degree of the first expansion valve independently from the control of the opening degree of the second expansion valve.

2. The refrigeration cycle apparatus of claim 1, wherein the bypass has a bypass expansion device having an adjustable opening degree.

3. The refrigeration cycle apparatus of claim 2, wherein the opening degree of the bypass expansion device is maximized at a start of the compressor.

4. The refrigeration cycle apparatus of claim 2, wherein the controller is configured to control the opening degree of the bypass expansion device to increase with a discharging temperature or a discharging pressure of the compressor.

5. The refrigeration cycle apparatus of claim 1, wherein the bypass is connected to a suction pipe of the compressor.

6. The refrigeration cycle apparatus of claim 1, wherein the first refrigerant is HFO1123 and the second refrigerant contains at least one of R32, HFO1234yf, and HFO1234ze.

7. The refrigeration cycle apparatus of claim 1, wherein the controller is configured to control the opening degree of the second expansion valve such that the refrigerant between the first expansion valve and the second expansion valve has a predetermined saturation temperature.

* * * * *